Jan. 9, 1962 H. W. McCARD 3,015,932
FALSE TWISTER

Filed May 4, 1960 2 Sheets-Sheet 1

INVENTOR
HENRY W. McCARD
BY
ATTORNEYS

Jan. 9, 1962  H. W. McCARD  3,015,932
FALSE TWISTER
Filed May 4, 1960  2 Sheets-Sheet 2
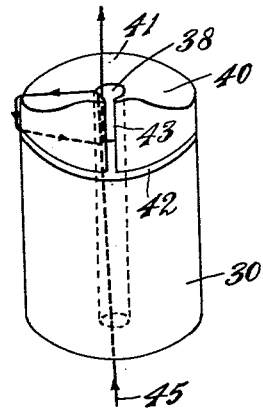
Fig. 6.
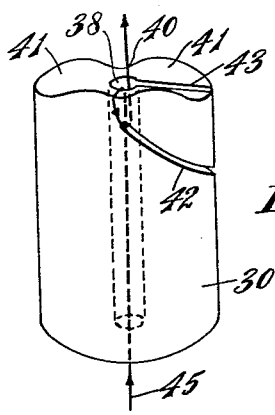
Fig. 7.
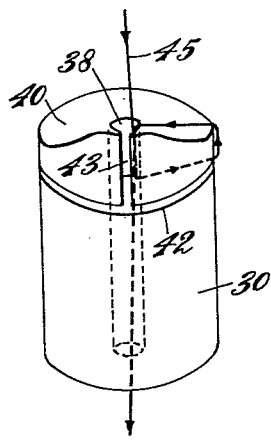
Fig. 8.
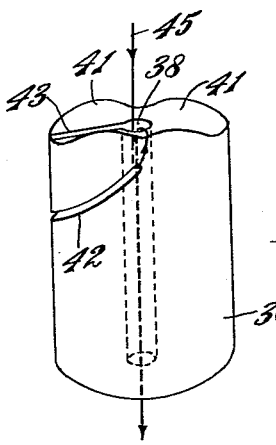
Fig. 9.
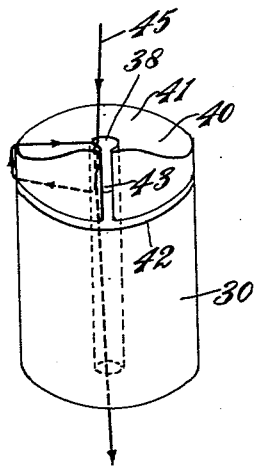
Fig. 10.
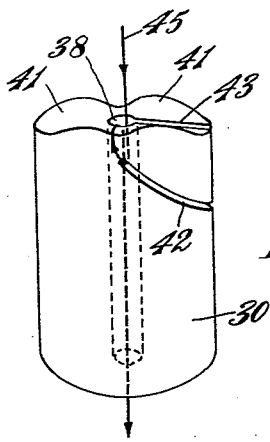
Fig. 11.
INVENTOR
HENRY W. McCARD
BY
ATTORNEYS

United States Patent Office 3,015,932
Patented Jan. 9, 1962

3,015,932
FALSE TWISTER
Henry W. McCard, 5418 Westford Road,
Philadelphia, Pa.
Filed May 4, 1960, Ser. No. 26,744
3 Claims. (Cl. 57—77.3)

The present invention relates to twister heads of the character used in texturing textile materials.

A purpose of the invention is to provide an improved mounting for the bearings in a twister head which will be simple, inexpensive and more reliable in service.

A further purpose is to mount the bearings of a twister head so that axial adjustment can readily be accomplished.

A further purpose is to compensate for lack of concentricity in the bearing housing or the bearings or both.

A further purpose is to allow for lack of coaxiality of the bearings.

A further purpose is to suppress vibration either due to the spindle or to the drive.

A further purpose is to produce an improved twister head which will have longer life and be less subject to wear.

A further purpose is to produce a twister head which will function equally well in four different methods of threading.

A further purpose is to make the threading of a twister head easier and more convenient.

A further purpose is to reduce the danger of damage to yarn in twisting.

Further purposes appear in the specification and in the claims.

In the drawings I have chosen to illustrate one only of the numerous embodiments in which the invention may appear, selecting the form shown from the standpoints of convenience in illustration, sataisfactory operation and clear demonstration of the principles involved.

FIGURE 6 is a view similar to FIGURE 4 showing a second alternate method of threading.

FIGURE 7 is a view similar to FIGURE 5 showing the second alternate method of threading.

FIGURE 8 is a view similar to FIGURE 4 showing a third alternate method of threading.

FIGURE 9 is a view similar to FIGURE 5 showing the third alternate method of threading.

FIGURE 10 is a view similar to FIGURE 4 showing a fourth alternate method of threading.

FIGURE 11 is a view similar to FIGURE 5 showing the fourth alternate method of threading.

Figure 1:
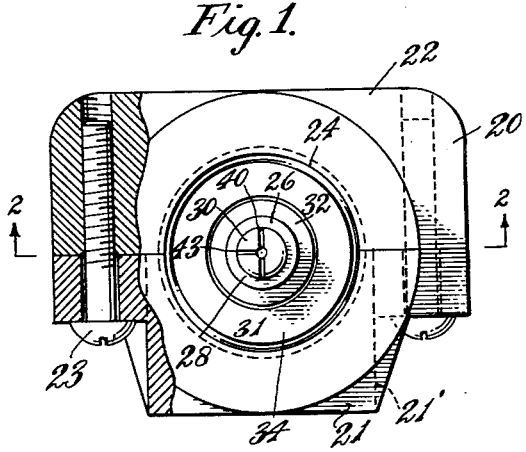
FIGURE 1 is a top plan view partly broken away of a twister according to the invention.
Figure 2:
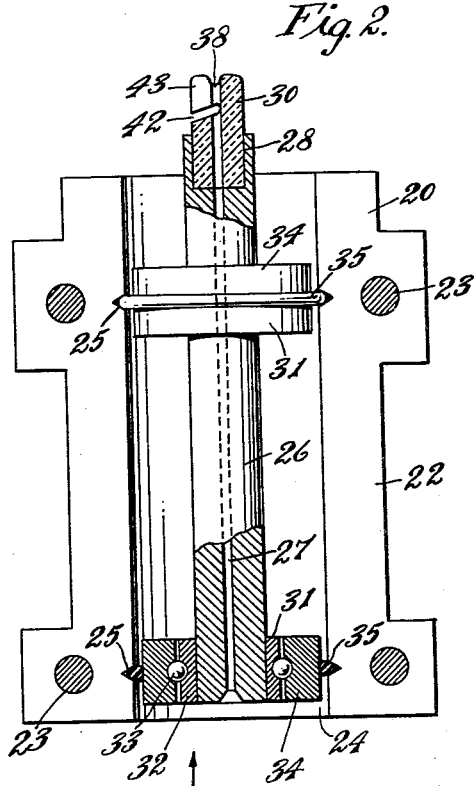
FIGURE 2 is a section on the line 2—2 of FIGURE 1, with one of the bearings and one of the O-rings and the adjoining portion of the spindle shown in elevation.
Figure 3:
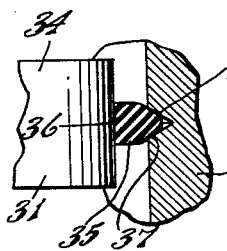
FIGURE 3 is a fragmentary enlargement of a portion of FIGURE 2, showing the adjoining bearing in elevation.

Describing in illustration but not in limitation and referring to the drawings:

False twisting operations are used in the textile field primarily in connection with texturing heat settable or thermoplastic yarn, which is usually continuous filament multifilament yarn of nylon, acrylic, polyester, cellulose acetate, polyvinylchloride or other similar thermoplastic plastic material. The mechanism builds up a large amount of false twist, and the yarn is heated to produce crimp, and then after the yarn has cooled it passes through the false twister forming a loop which limits the forward extension of the twist, and the false twist is removed beyond the false twister.

In false twisters tremendous speeds are now being used, commonly in the range from 35,000 to 150,000 r.p.m.

Operation at such high speeds imposes a serious problem both from the standpoint of proper mounting of bearings which can stand up under this service, and also from the standpoint of design of a twister head which will meet such severe service requirements.

It should be evident that under such high speeds of operation, defects in the mounting which would otherwise not be noticeable are likely to show up. As a practical matter, it has been found that it is almost impossible to produce two bearing mounting sockets which are truly concentric within themselves and are truly coaxial with respect to one another.

It is therefore very important in the invention to mount the bearings in such a manner that residual stresses produced by the mounting can be largely eliminated, and the mounting can eliminate undesirable effects of lack of dimensional accuracy.

According to the invention, suitable bearings are provided at spaced points along the spindle. While ball bearings are preferred, roller bearings, plain journal bearings or gas bearings may be used if desired.

The outside of the bearings is of circular contour, and this is surrounded and engaged by an elastomer O-ring, which itself is gripped in a V-shaped groove of a split housing which applies slight radial load by the clamping together of the housing.

It is important in accordance with the invention that the groove be of V-shape, suitably having an angle at the V between 30° and 110° and preferably having an angle of between 60° and 90° at the V, so that both of the sloping V sides will apply force components which tend to converge toward the area at which the O-ring grips the outside of the bearing.

The O-ring may be of rubber, neoprene, Buna S, Buna N or other suitable elastomer.

It is very important not to use a rectangular groove, as this does not effectively compress the O-ring radially to provide proper gripping of the outside of the bearing.

This mounting of the bearings by the O-ring is very advantageous.

The bearings are permitted to adjust axially and this calls for differences in axial spacing of the grooves with respect to the initial axial position of the O-rings.

The O-rings also compensate for lack of concentricity of the V-grooves in the inside of the housing.

The O-rings also compensate for lack of concentricity in the outsides of the bearings.

The O-rings also correct for lack of coaxiality of the two bearings.

Another great advantage of the invention is that the O-rings act like shock mountings, tending to suppress or snub vibrations induced in the spindle so that they are not carried over to other spindles and also vibrations induced in the housing so that they are not applied to the spindle.

In accordance with the present invention an improved twist head is used compared to the prior art. As in the prior art there is a coaxial opening. At the top and generally close to the axis, a transverse groove runs clear across the twister head of the invention.

Below the top and extending in from the side toward the center is a loop-forming groove. The loop-forming groove slopes upwardly as it extends inwardly so as to prevent the loop from coming off at the side. The loop-forming groove has its two ends symmetrically placed almost beneath the transverse groove. In the preferred embodiment the loop-forming groove terminates just on one side of the axis and the center of the transverse groove is just on the other side of the axis, so as to tend to prevent rubbing of parts of the loop of yarn together.

Symmetrically placed on the side having the loop-forming groove there is a center threading groove which extends clear to the center opening and from the top down to the loop-forming groove.

The twister head of the invention operates effectively at the high speeds above referred to with very long life, and therefore a minimum of wear. The construction is very safe from the standpoint that the yarn is not likely to become abraded or otherwise damaged.

As will be explained later, the twister head is very adaptable, lending itself to four different methods of threading, so that alternate wear surfaces are provided which further increases the life.

While the device of the invention will, it is believed, have its best application in false twisting, it will be useful wherever a twister is required.

I illustrate a metallic housing 20 consisting of a front half 21 and a rear half 22 held together by bolts 23.

The center of the housing is coaxially bored at 24. Near the top and also near the bottom extending around the housing perpendicular to the axis are V-shaped grooves 25 with their wide opening directed symmetrically radially inwardly.

Placed coaxial with the bore in the housing is a twister spindle 26 which in itself may be of well known character and is driven by a belt entering a window 21' in housing half 21 between the grooves 25. A center opening 27 extends through the axis of the spindle, and passes the yarn as well known. At the upper end the spindle has a socket 28 into which a twister head 30 is secured in any well known manner as by cementing or mounting of a suitable attachment element as well known in the art.

The spindle is surrounded at positions opposite the grooves 25 by suitable bearings 31, which in the form shown are ball bearings having inner races 32 suitably pressed on the spindle, balls 33 and outer races 34 having circumferential outside surfaces.

Elastomeric O-rings 35 initially of circular cross section are placed around and suitably in slightly gripping relation to the outside of the outer races 34, and are placed in the V-grooves 25, and then the housing halves 21 and 22 are drawn together by the bolts 23 pinching the O-rings in cross section so that they are subjected to radial deflection and tend to flatten slightly at 36 where they engage the outside of the outer races of the bearings and also flatten at 37 where they engage the sides of the V-grooves, thus holding the bearings in a form of elastomeric suspension which permits axial adjustment, correction for lack of concentricity, correction for lack of coaxiality and elimination of vibration.

The twist head 30 of the invention is preferably made of a ceramic material such as heat-sintered aluminum oxide or titanium oxide, although it may permissibly be made of metal such as stainless steel, or of porcelain.

In the twister head, at the center in line with the center opening 27 in the spindle is a center vertical opening 38 which is suitably of the same diameter as the opening 27 in the spindle.

At the top and extending transversely there is a groove 40 which produces shallow lobes 41 on each side. The transverse groove 40 runs clear across, but as will be later explained only one-half of it is used at any one time.

Below the top and extending in from one side symmetrical with the transverse groove 40 is a loop-forming groove 42 which is seen best in FIGURES 5, 7, 9 and 11, lies in one plane, and extends upwardly as it extends inwardly, permitting the formation of a complete yarn loop which stops forward propagation of twist, and at the same time preventing the loop from coming off because of the hook effect of the upward and inward slope of the groove 42.

At the middle as viewed from the front symmetrical with the transverse groove and the loop-forming groove there is a vertical threading groove 43 which extends from the top to the loop-forming groove 42 and from the radial outside to the interior opening 38. This threading groove permits threading of the head without great difficulty since the loop can be formed by taking the yarn in through the threading groove.

All of the corners of the head are slightly filleted or rounded, so that there can be no cutting of the yarn.

In the preferred embodiment as shown, the center of the transverse groove 40 is slightly back of the axis, and the inner and upper end of the loop-forming groove at 44 is slightly forward of the axis, so as to prevent the two portions of the loop of yarn from rubbing together. This difference need be only very slight, of the order of one-thousandth of an inch.

The device may be threaded in four different ways and therefore it has four different sets of wear surfaces.

Any two of these threadings can be used in the same service, and the head after it has become worn on use for two of the threadings may be mounted in another spindle for use in the two other threadings.

Figure 4:
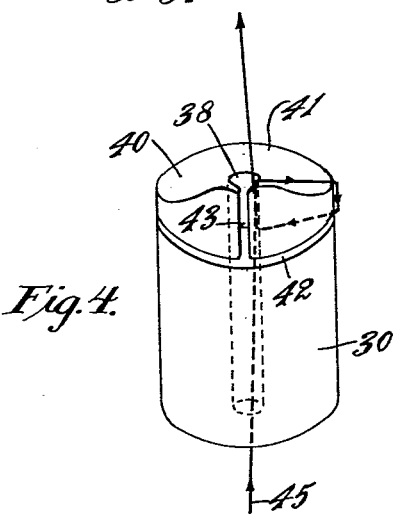
FIGURE 4 is a perspective of the twister head of the invention viewed from the front, with one of the alternate methods of threading the yarn being employed.
Figure 5:
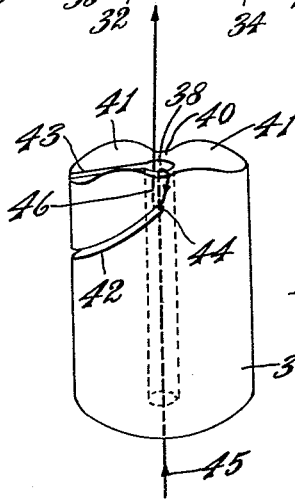
FIGURE 5 is a perspective of the twister head of FIGURE 4 from the side.

FIGURES 4 and 5 show a threading for yarn 45 entering at the bottom of the spindle, passing up through the center opening 38 then passing to the right in the transverse groove 40 in FIGURE 4, then down the outside and into the right-hand portion of the loop-forming groove, then into the center and up through the center opening 38 to form a loop. There is a slight but perceptible clearance between the two stretches of yarn which are in generally parallel relation in the center opening 38, as best seen in FIGURE 5 at 46.

FIGURES 6 and 7 show a threading similar to FIGURES 4 and 5 except that it extends to the left rather than to the right in FIGURE 6, so that different wear surfaces are employed.

FIGURES 8 and 9 show the twister head threaded to deal with yarn which passes down through the head, the yarn first passing through the center opening and then to the right in FIGURE 8 through the loop-forming groove and then up at the outside, then radially inward through the right-hand half of the transverse groove, and finally down through the center opening 38.

FIGURE 10 shows a threading exactly similar to that of FIGURES 8 and 9 except that it extends to the left in FIGURE 10 rather than to the right and therefore uses different wearing surfaces of the twister head.

It will be evident that while the twister head will normally be placed at the upper end of the spindle, the device can be operated in inverted relation, in which case the head will be placed at the bottom end of the spindle.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A twister head having an end adapted to connect to a spindle, having an axial opening, having a generally central transverse groove at the end remote from the spindle, having a transverse loop-forming groove at an intermediate position between the ends of the twister head, said loop-forming groove being nearer to the end of the twister head having a transverse groove and forming an acute angle with said axial opening, said loop-forming groove forming a segment of a plane which slopes inwardly toward the end remote from the spindle and terminates in a straight side which lies generally parallel to the said transverse groove, and a radial threading groove extending from the circumference of said head on the side having the loop-forming groove to the axial opening so as to intersect the plane segment formed by the said loop-forming groove and to extend to the said end remote from the spindle.

2. A twister head of claim 1, in which the center of the transverse groove at the end remote from the spindle and the inward side of the plane segment formed by the loop-forming groove straddle the said twister head axis.

3. A twister head top of claim 1, in which the threading groove is in the middle between the ends of the loop-forming groove.

References Cited in the file of this patent
UNITED STATES PATENTS

| | | |
|---|---|---|
| 177,861 | Martin | May 23, 1876 |
| 884,621 | Singleton et al. | Apr. 14, 1908 |
| 2,111,211 | Finlayson et al. | Mar. 15, 1938 |
| 2,439,269 | Shofer | Apr. 6, 1948 |
| 2,473,267 | Wightman | June 14, 1949 |
| 2,556,919 | Hardaire et al. | June 12, 1951 |
| 2,829,487 | Stoddard et al. | Apr. 8, 1958 |
| 2,914,905 | Andrews et al. | Dec. 1, 1959 |